United States Patent [19]

Weaver

[11] 4,159,662

[45] Jul. 3, 1979

[54] MUFFIN SPLITTER

[75] Inventor: John A. Weaver, York, Pa.

[73] Assignee: Alto Corporation, York, Pa.

[21] Appl. No.: 958,797

[22] Filed: Nov. 8, 1978

Related U.S. Application Data

[63] Continuation of Ser. No. 847,662, Nov. 1, 1977, abandoned.

[51] Int. Cl.² .......................... B26D 3/28; B26D 4/76
[52] U.S. Cl. ........................................ 83/867; 83/304; 83/324; 83/868; 225/97
[58] Field of Search .................. 83/867, 868, 304, 324; 225/97

[56] References Cited

U.S. PATENT DOCUMENTS

| | | | |
|---|---|---|---|
| 3,192,975 | 7/1965 | Noel | 225/93 |
| 3,409,115 | 11/1968 | Porcaro | 198/411 |
| 3,704,735 | 12/1972 | Noel et al. | 83/868 |
| 3,733,942 | 5/1973 | Noel | 83/868 |
| 3,737,084 | 6/1973 | Noel | 225/97 |

*Primary Examiner*—Frank T. Yost
*Attorney, Agent, or Firm*—Thomas Hooker

[57] ABSTRACT

A muffin splitter having a muffin conveyor and tining assemblies located to either side of the conveyor for tining the muffins as they move along the conveyor. The tining apparatus may be deactivated to permit muffins to be passed along the conveyor without tining.

34 Claims, 9 Drawing Figures

MUFFIN SPLITTER

This application is a continuation of my co-pending U.S. patent application for Muffin Splitter, Ser. No. 847,662 filed Nov. 1, 1977 and now abandoned.

The invention relates to apparatus for splitting English muffins by a tining operation so that the muffin may be easily separated into halves by the customer. In a continuous bakery, English muffins are baked in a griddle-type oven, conveyed from the griddle oven through a cooling conveyor to a tining machine and thence to a bagging machine where they are packaged for ultimate delivery to the customer. A circumferencial muffin slitter may be located between the storage conveyor and the muffin tining machine if desired.

Frequently it is necessary to package muffins which have not been tined. When conventional tining apparatus, such as the muffin tining apparatus disclosed in U.S. Pat. Nos. 3,192,975, 3,704,735 and 3,733,942 is used in a line it has been necessary to remove the tining apparatus from the muffin line, and then reconstruct the line to convey muffins from the cooling conveyor or circumferencial slitter directly to the bagging apparatus. The line must be again reconstructed when the run of untined muffins is completed and it is desired once again to run tined muffins. Alterations of the muffin line require that the line be shut down so there is no output during changeover. Changeover also requires labor costs and the use of additional equipment.

The muffin splitter of the present invention is intended for permanent installation in a muffin line and includes a conveyor assembly for moving the muffins from the storage conveyor or slitting apparatus downstream to the muffin packaging apparatus. Muffin tining assemblies are located to either side of the conveyor assembly and automatically tine the muffins. Preferably canted tines are used to provide a desired saw toothed-type split upon separation of the halves of the muffin. If desired, the tining assemblies are easily deactivated so that the tines are not extended into the path of muffins as they are moved downstream on the muffin conveying assembly. In this way, the muffins may be continuously conveyed to the bagging machine and may be tined or untined as desired. There is no need to change the entire muffin line when it is desired to shift from tined or untined muffins.

Other objects and features of the invention will become apparent as the description proceeds, especially when taken in conjunction with the accompanying drawings illustrating the invention, of which there are four sheets.

Figure 1:
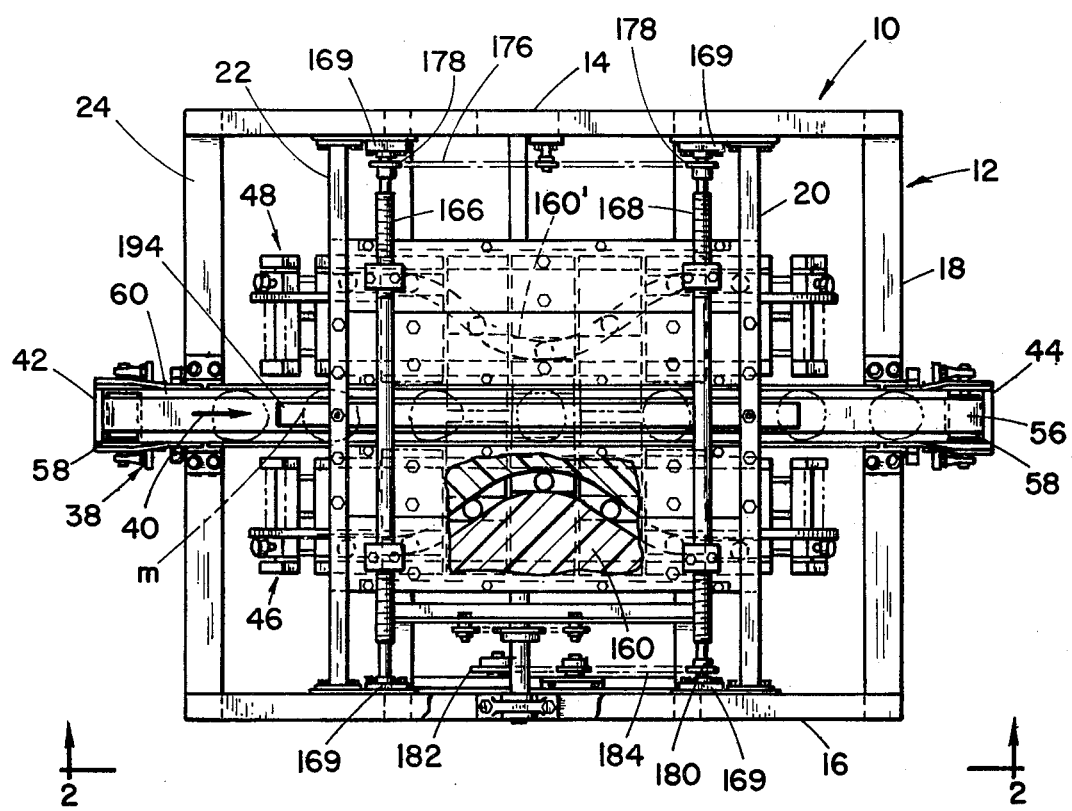
FIG. 1 is a top plan view, partially broken away, of a muffin splitter according to the invention.

Referring now to the Figures, muffin splitter 10 includes a metal frame 12 having frame sides 14 and 16 and a number of transversely extending bars 18, 20, 22, 24, 26, 28, 30, 32, 34 and 36 joining the sides of the frame. Muffin conveyor assembly 38 is located on the top of the splitter 10 between sides 14 and 16 and is supported by bars 18 and 24. The conveyor assembly includes a conveyor operable to move individual muffins M downstream along the length of the muffin splitter 10 in the direction of arrow 40. The muffins move from an infeed end 42 of the muffin splitter located on the left as shown in FIG. 1 to a discharge end 44 of the conveyor assembly located on the right as shown in FIG. 1.

Figure 4:
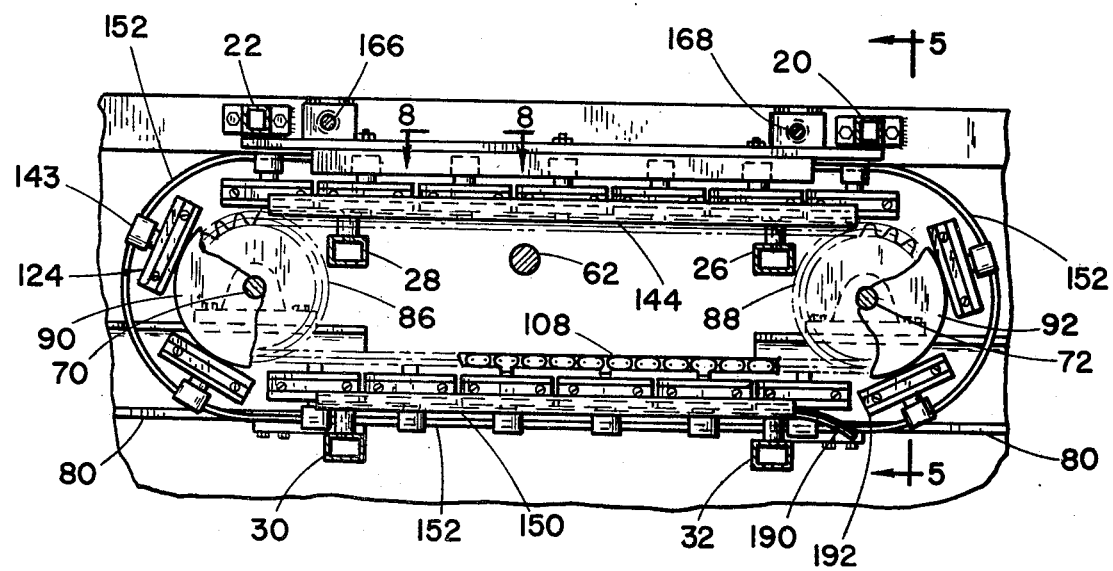
FIG. 4 is a sectional view taken along line 4—4 of FIG. 3.

A pair of like muffin tine assemblies 46 and 48 are located to either side of conveyor assembly 38 and, when operable, cooperate to tine the muffins automatically as the muffins move down along the conveyor assembly from end 42 to end 44. As illustrated in FIG. 4, the muffin tine assemblies are primarily supported on bars 26, 28, 30 and 32.

Drive assembly 50, supported on bars 34 and 36, includes a transmission 52 driven by drive motor 54. Assembly 50 drives the conveyor assembly 38 and both muffin tine assemblies 46 and 48 through chain drives which will be described in further detail.

The muffin conveyor assembly 38 includes a conveyor belt 56 which is wrapped around a pair of end rollers 58 located at the infeed end and at the discharge end of the assembly. The flat upper muffin-conveying run of belt 56 rests on a support plate 60 which extends along the assembly between rollers 58. The lower run of the belt 56 is wrapped around a drive roller (not illustrated) on shaft 62 which in turn is journaled in a pair of bearings 64 mounted on cross members 66 forming parts of frame sides 14 and 16. A suitable sprocket gear is mounted on the shaft 62 and a drive chain 68 is wrapped around the gear and also a sprocket gear on transmission 52 to provide a connection between the drive assembly 50 and conveyor assembly 38.

The muffin tine assemblies 46 and 48 are essentially identical mirror images of each other with certain differences which will be pointed out below. Accordingly, assembly 46 will be described in detail, it being understood that assembly 48 is essentially identical to assembly 46. In the drawings elements of assembly 48 are identified by the prime of the number used to identify the corresponding elements of assembly 46.

Muffin tine assembly 46 includes a pair of spaced shafts 70 and 72 which are journaled in pairs of bearings 74 and 76. Bearings 74 mounted on rails 78 of frame side 16 and bearings 76 are mounted on a pair of central beams 80 which are, in turn, mounted on transverse bars 82, 30, 32 and 84.

Figure 2:
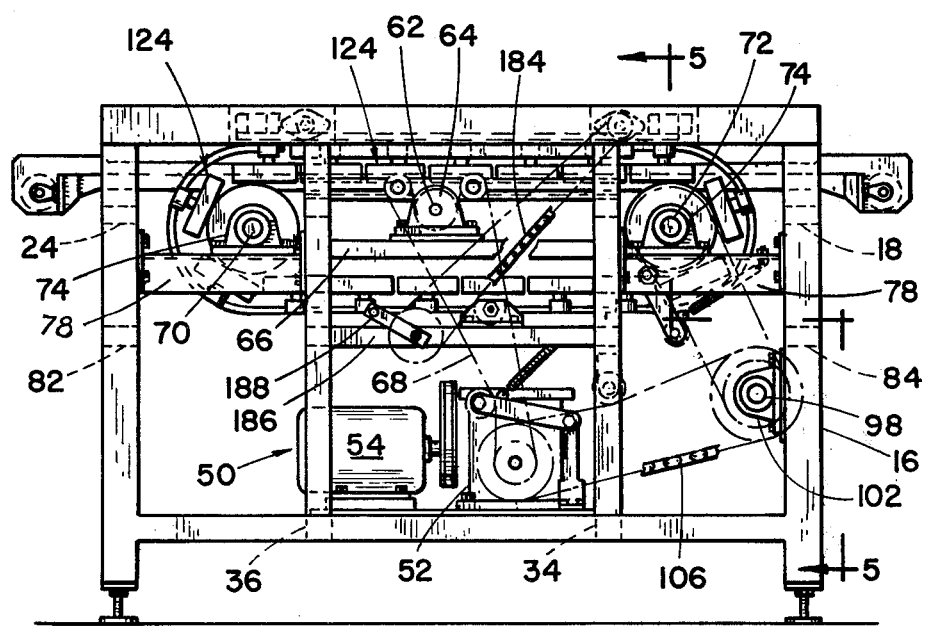
FIG. 2 is a side view of the muffin splitter of FIG. 1 taken along line 2—2.
Figure 5:
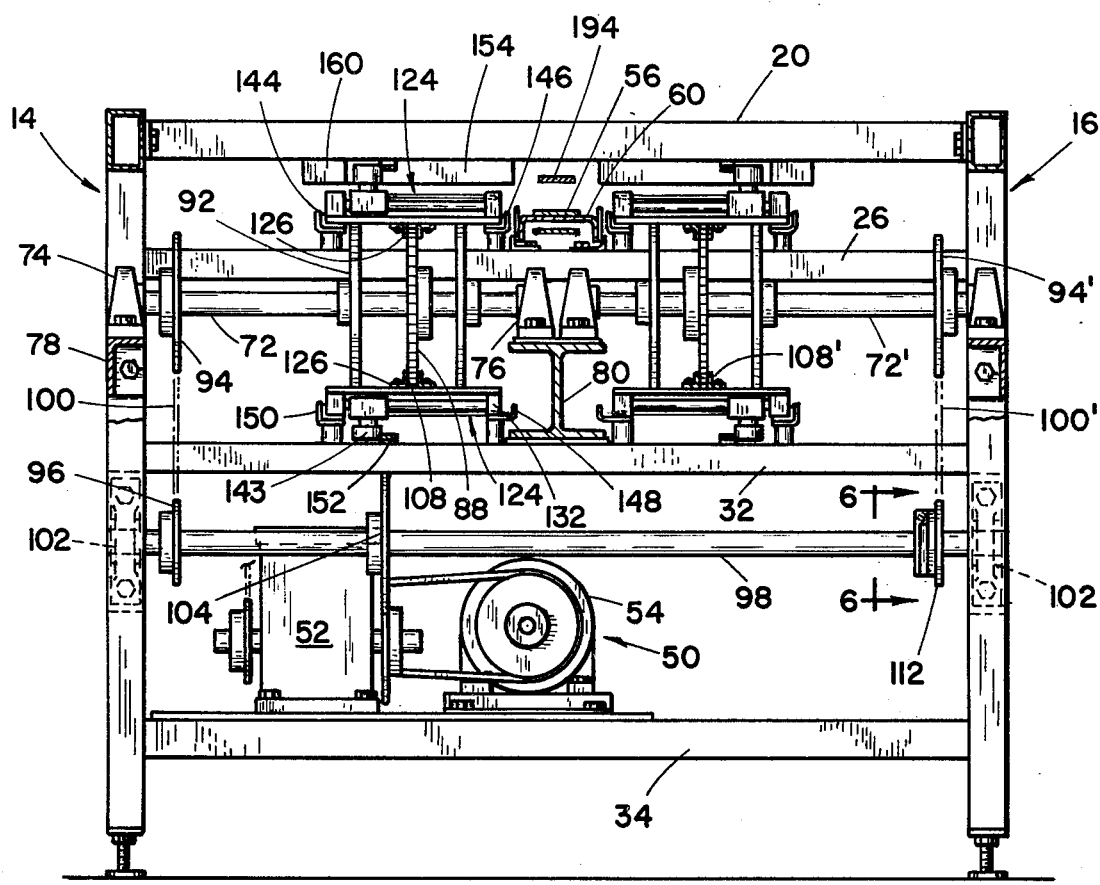
FIG. 5 is a sectional view taken generally along line 5—5 of FIG. 2.

Each shaft 70, 72 carries an assembly sprocket gear 86, 88 with a pair of support discs 90, 92 located to either side of the sprocket gear. The sprocket gear and discs rotate with their respective shafts. Additional sprocket gear 94 is secured to shaft 72 adjacent side 14 and is connected to sprocket gear 96 located on transverse shaft 98 by chain 100. The ends of shaft 98 are journaled in bearings 102 as illustrated in FIGS. 2 and 5. Shaft 98 carries sprocket gear 104 which is connected to a drive sprocket of transmission 52 by chain 106. A tine assembly drive chain 108 is wrapped around sprockets 86 and 88 so that the drive assembly 50, through chains 106, 100 and 108 rotates the sprocket gears 86 and 88 in a clockwise direction as viewed in FIG. 4 and moves the upper run of chain 108 downstream in the same direction and speed as the drive assembly 38 moves the upper muffin supporting run of the conveyor belt 56 through chain 68.

Figure 6:
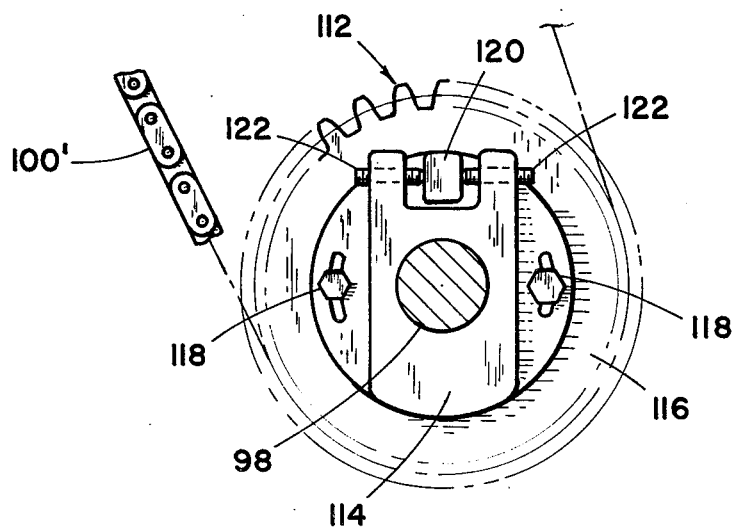
FIG. 6 is a sectional view taken along line 6—6 of FIG. 5.

The chain 108' of muffin tine assembly 48, which corresponds to chain 108 of muffin tine assembly 46, is also driven from shaft 98 so that the upper run of chain 108' moves downstream in the same direction and speed as the upper run of conveyor belt 56. In the case of the assembly 48, a drive chain 100' connects adjustable sprocket gear 112 on shaft 98 with sprocket gear 94' on shaft 72'. The adjustable sprocket gear 112 is illustrated in detail in FIG. 6 and includes a hub 114 which in nonrotatably mounted on shaft 98. Gear 116 is rotatably mounted on the hub and may be fixed to the hub by adjustable bolt and slot connections 118. The gear carries a dog 120 which is confined between a pair of stop screws 122 carried on the arms on hub 114. The proper angular orientation of the gear 116 with respect to the shaft 98 is obtained by loosening connection 118 and adjusting the screws 122 as required. Connections 118 are then tightened. The adjustable sprocket gear 112 is provided to permit adjustment of the upper runs of chains 108 and 108' so that corresponding tine cars on the cables are offset from each other an amount required to permit the tines carried by the cars to extend past each other.

Muffin tine assembly 46, 48 includes a plurality of tine cars 124 which are secured to chain 108 at close intervals and which are moved with the chain by sprocket gears 86 and 88 so that the upper run of cars 124 moves downstream in the same direction and speed as the upper muffin bearing run of belt 56. The cars are secured to the chain 108 by angles 126 as illustrated in FIG. 5 so that they are positioned on the outside of the chain.

Figure 8:
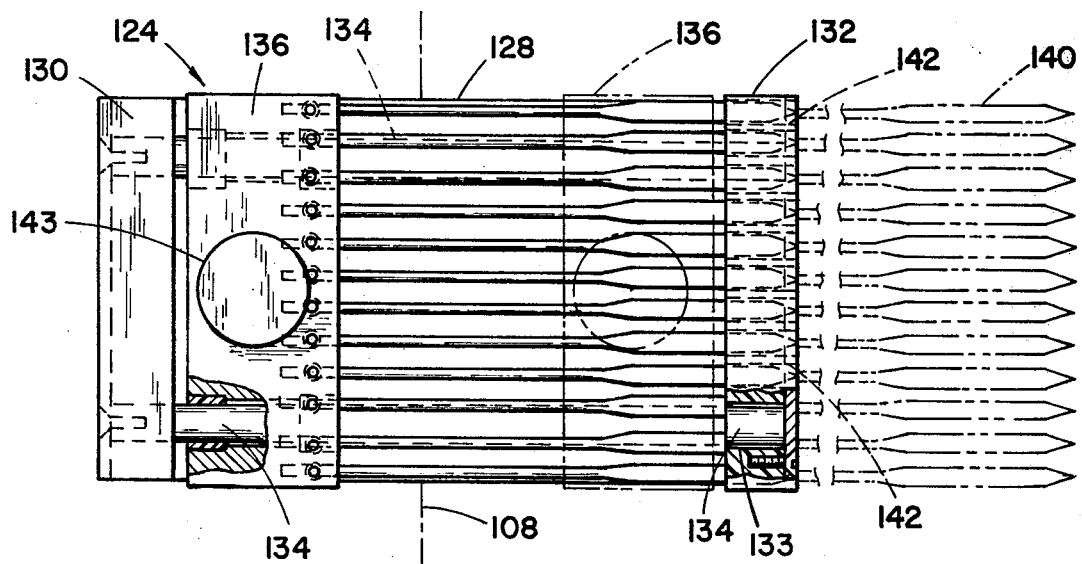
FIG. 8 is a top view of one of the tine cams as used in the muffin splitter.

Referring now to FIG. 8, each tine car 124 includes a rectangular mounting plate 128 having a steel transverse mounting bar 130 located on one end thereof and a second transverse bar 132 located at the opposite end thereof. Bar 132 is preferably formed of an ultra high molecular weight polyethylene plastic material. A pair of slide rods 134 extend between bars 130 and 132 with the left-hand ends of the rods, as viewed in FIG. 8, fixed in bores in bar 130 and with the other ends of the rods loosely confined within oversized bores 133 in bar 132. A slide bar 136 is mounted on rods 134 and is movable back and forth on the rods between the solid line and dashed line positions as illustrated in FIG. 8. Bar 136 carries a plurality of muffin tines 138, each of which is secured to the bar and extends away therefrom to a sharp pointed piercing end 140. Each tine extends through an oversized bore 142 in the ultra high molecular weight polyethylene bar 132. The bar 132 is preferably formed from this material to prevent dulling of the sharp endges of tine ends 140 upon movement of the slide 136 back and forth on the rods.

The ends of the rods at bar 132 are located within the oversize bores 133 to maintain parallel alignment between the rods despite the differences in the coefficience of thermal expansion of bars 130 and 132. In this way, binding of the slide bar on the rods is prevented. Slide 136 carries a cylindrical cam follower 143 on the side away from plate 128. Engagement between follower 143 and the cams of the muffin tine assemblies move the slide back and forth with respect ot the tine car.

The cars 124 are held in position transverse to chain 108 as they are moved around the path of the chain by guide rails 144, 146, 148 and 150, as illustrated in FIG. 5. These rails are L-shaped in cross section. Rails 144, 146 and 150 are provided with interior bearing surfaces preferably made of ultra high molecular weight polyethylene plastic. These surfaces engage the adjacent metal components of the cars to provide low friction contact. On the lower or upstream run of chain 108, the cars are inverted from a position shown in FIG. 8 and the ultra high molecular weight polyethylene bar 132 rests directly on the metal rail 148, thus providing the desired low friction contact.

The tine cars are maintained in proper orientation by the spaced support discs 90 and 92 as they are rotated around sprocket gears 86 and 88 on shafts 70 and 72. As illustrated in FIG. 5, the discs 90 and 92 engage plate 128 of each car as it passes around the shaft thereby preventing tilting of the cars.

Figure 3:
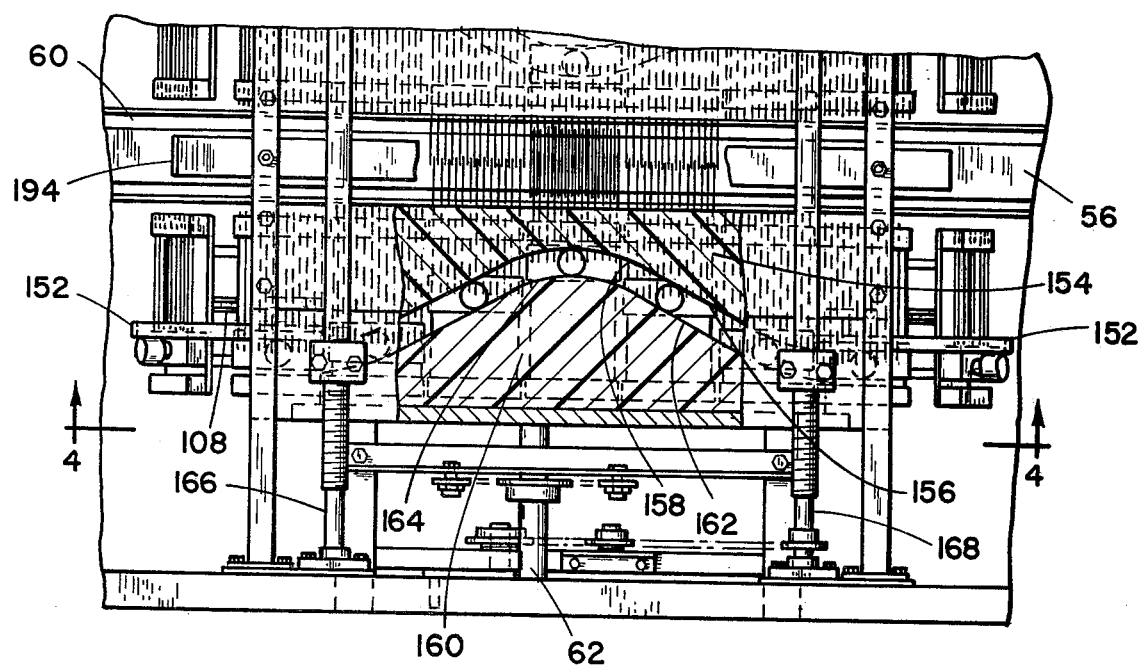
FIG. 3 is an enlarged top view of part of FIG. 1.

As the cars are moved around the path of chain 108 the slides 136 and tines 138 are kept in their retracted position by fixed cam rail 152, as illustrated in FIGS. 3, 4 and 5. With the exception of the upper downstream run of chain 108, rail 152 extends completely around the path of the chain. When muffin splitter 10 is in the splitting mode, the tines on the cars traveling through this run are first extended and when withdrawn so that the muffins on belt 56 are confined between the tines extending from the opposed assemblies 46 and 48 and are pierced by the tines.

Figure 9:
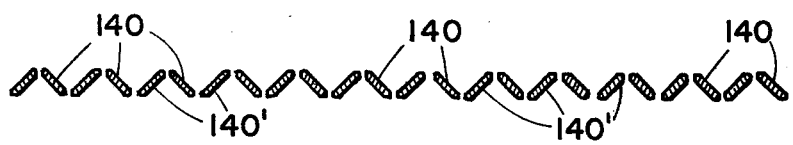
FIG. 9 is a sectional view taken through the tines of two cars when extended.

As illustrated in FIG. 9, the piercing ends 140 of the tines carried by cars 124 of muffin tine assembly 46 are all slanted 45° to one side of the vertical. The piercing ends 140' of the tines carried by cars 124' of muffin tine assembly 48 are slanted 45° to the other side of the vertical and are spaced halfway between tines 140. In this way, when the tines of the opposite cars are simultaneously extended into muffins on belt 56 they pass each other to provide weakening saw tooth punctures extending completely through the muffin. The relative positions of the opposing tine cars 124 and 124' required for the tine offset is determined by proper adjustment of the gear 112 as previously described.

The movement of the tines back and forth in cars 124 is controlled by engagement between the cam followers 143 and a pair of cams mounted on the top of the frame 12 above the upper run of chain 108. A first fixed cam 154 is secured to the frame adjacent the upper run of belt 56 and includes a concave sinusoidal cam surface 156 extending as a continuation of cam rail 152 from the upstream end of the rail toward the belt 56 to a low point 158 adjacent belt 56 midway between the ends of the cam rail 152 and then back to the downstream end of rail 152.

Adjustable cam 160 is located on the side of cam 154 away from belt 56 and includes a convex sinsoidal cam surface 162 having an apex 164 adjacent the low point 158 of cam surface 156.

Figure 7:
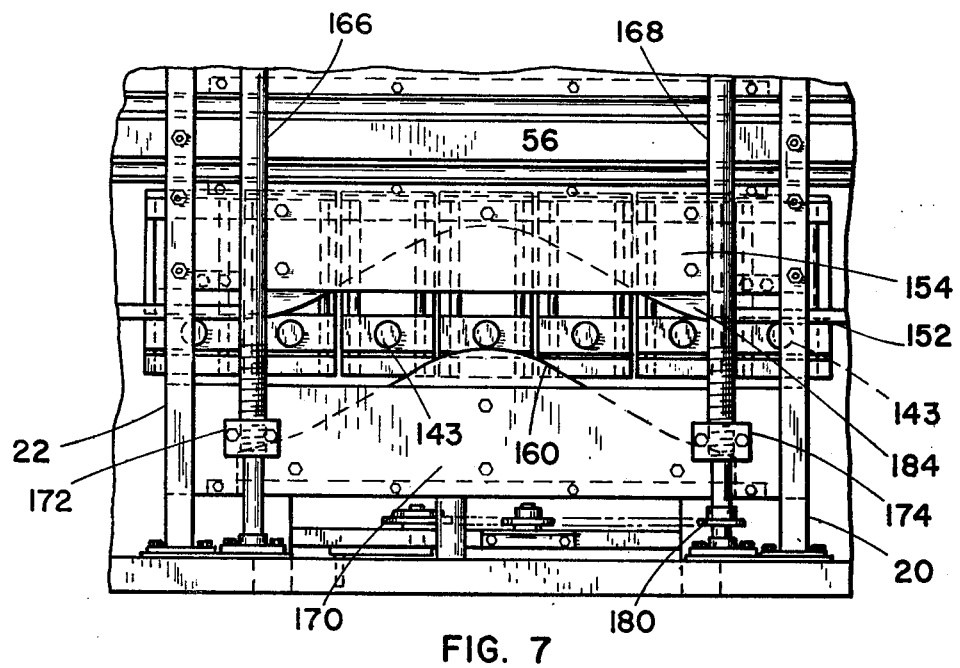
FIG. 7 is a view similar to FIG. 3 but illustrating the tining cams in the open position.

A pair of reverse threaded shafts 166 and 168 are journaled in bearings 169 on opposite sides 14 and 16 of frame 12. These shafts are located adjacent the ends of the cam rails 152 and above the cams 154 and 160. As illustrated in FIG. 7, cam 160 is bolted to the lower surface of a plate 170 which extends beneath threaded shafts 166 and 168. Nuts 172, which engage the threads of shafts 166 and 168 are bolted to the top of plate 170 so that rotation of the shafts moves the plate and cam toward and away from the belt 56. Cam 154 is mounted on the lower surface of plate 174 which in turn is mounted on frame cross bars 20 and 22. The shafts 166 and 168 are connected together by a chain 176 which is wrapped around sprockets 178 located on the ends of the shafts adjacent frame side 14.

A sprocket gear 180 is secured to the end of the shaft 168 adjacent frame side 16. The gear is connected to a sprocket gear 182 on a shaft journaled on frame cross member 186 by chain 184. Hand crank 188 is mounted on the shaft so that rotation of the crank rotates shafts 166 and 168 to move the convex cams 160 and 160' of both muffin tine assemblies toward and away from the fixed concave cams 154 and 154'. When the cams 160 and 160' are in the full inner position the adjacent edges of plates 170 and 174 abut each other as illustrated in FIG. 1 and the cam surfaces 156 and 162 are spaced apart a distance sufficient to allow passage of the cam followers 143 on the tine cars 124.

Preferably, both cams 154 and 160 are formed from a resilient material such as Benelex composition material made and sold by the Masonite Corporation. This material has an inherent resiliency which cushions initial contact between the cam followers and the surfaces of the cams to reduce the undesirable slapping noise which otherwise would occur upon initial contact between the cam followers and steel or hardened metal cams. The cams may be formed from other plastic composition materials having sufficient resiliency to reduce sound while also having sufficient strength to prevent deterioration upon engagement of the cam followers in production operation of the splitter 10.

Shafts 166 and 168 may also be rotated to withdraw cams 160 and 160' to positions indicated in FIG. 7 where the cam surfaces 162 and 162' have been moved out of the straight line path of movement of the cam followers 143 and 143' from the upstream ends of cam rails 152 and 152' to the downstream ends of cam rails.

In operation, muffin splitter 10 is placed in a muffin line with infeed end 42 of the conveyor assembly 38 positioned to receive freshly baked and cooled muffins discharged from a storage conveyor. A muffin packaging apparatus is positioned adjacent the discharge end 44 of the muffin conveyor assembly to receive and package muffins coveyed along the assembly on belt 56. When it is desired to tine muffins the convex cams 160 and 160' are located in the extended or inner positions adjacent the concave cams 154 and 154' as illustrated in FIGS. 1 and 3. When it is desired to package untined muffins the cams 160 and 160' are in the retracted positions as illustrated in FIG. 7 so that the tine cars 124 are moved downstream along belt 56 without extension of the tines.

The operation of the muffin splitter 10 during muffin tining will now be described in detail, particularly with reference to FIGS. 1 and 3. With both cams 160 and 160' in the inner positions of FIGS. 1 and 3 the motor 54 is actuated to drive transmission 52 and thereby drive belt 56 through chain 68 so that the upper run of the belt resting on support 60 is moved downstream in the direction of arrow 40 from the infeed end 42 to the discharge end 44. At the same time, the drive motor and transmission rotate shaft 98 through chain 106 so that both shafts 72 and 72' drive the chains 108 and 108' of the muffin tine assemblies 46 and 48 so that the upper runs of these chains and the tines carried by the upper runs move downstream in the direction of arrow 40 at the same speed as the upper run of belt 56.

As the tine cars are moved along the path of the chains 108 and 108' the fixed cam rails 152 prevent the slides 136 from moving away from the retracted solid line positions shown in FIG. 8 so that as the cars traverse the rails 152 the tines are positively confined in the retracted position. As the cars move along the upper and lower runs of the chain they are supported against undesired tilting by guide rails 144, 146, 148 and 150. When the chains pass around the sprocket gears 86 and 88 the cars rest on the spaced pairs of discs 90 and 92 to prevent tilting and to assure that they are in proper alignment for engagement with the support rails of the next straight chain run.

As illustrated in FIG. 4, outwardly curved lead-ins 190 are provided on the upstream ends of rails 148 and 150 to facilitate initial engagement between the rails 148 and 150 and the tine cars. The leadins of this type are not required at the upstream end of the upper guide rails 144 and 146. When the tine cars are moved around discs 90 and deposited onto the rails 144 and 146, the motion of the chain moves surfaces of the cars engaging the discs around and then down onto the guide rails without the need of a lead-in. The situation is different at the upstream end of the lower guide rails 148 and 150 because there the movement of the cars 124 around the discs 92 tends to leave the forward corner 192 of the car hanging down. The lead-ins 190 assure that this corner is brought up to move the cars to the horizontal position for proper engagement with the guide rails 148 and 150.

As a tine car 124 is moved on chain 108 around gear 86 the cam follower 143 moves along fixed cam rail 152 until the car is seated on upper guide rails 144 and 146. Further movement of the car down the upper run of the chain moves the cam follower 143 into the cam slot defined between the surfaces of cams 154 and 160. Initially, the follower engages the rise portion of cam surface 162 so that it and the tines are moved toward the muffin conveyor assembly 38. The tines are progressively extended from bores 142 as the cam follower moves along the rise surface of cam 162 until the follower reaches apex 164 at which time the tines are fully extended and, as illustrated in FIG. 3, project outwardly from the car and across the muffin conveyor assembly. Continued downstream movement of the tine car moves cam follower 143 into engagement with the surface of cam 156 extending from bottom or valley 158 back to the fixed cam rail 152 to withdraw the tines from the fully extended position back to the solid line position as illustrated in FIG. 8.

While the extension and retraction of the tines carried by a single car of tine assembly 46 has been described in detail, the same operation occurs as the cars of both muffin tine assemblies 46 and 48 move down the upper runs. The cars of each assembly are located opposite cars of the other assembly so that they move downstream along the muffin conveyor assembly 38 in pairs with the tines of each pair of opposing cars being extended and retracted past each other as illustrated in FIG. 3. The tines of one assembly are spaced upstream by one half the spacing between adjacent tines from the tines of the other assembly so that when the tines of each pair of the cars are extended they move freely past each other and the muffins are confined between the tines and tined in the desired saw-toothed manner. See FIG. 9 which illustrates the relative positions of the flat cutting tine portions 140 and 140' of the opposing tines when extended.

With the muffin splitter 10 in operation and with the adjustable cams 160 and 160' in the inner position of FIG. 3 muffins are fed to the infeed end of the muffin conveyor assembly and are moved one at a time onto belt 56 so that they are carried thereby along the assembly 38 to the discharge end 44. As the muffins move from end 42 they pass under a holddown guide 194 which extends above the belt. The guide is adjusted to hold the muffins on the belt and assure that the extended tines pierce the central portions of the muffins. The levels of plate 60 and guides 194 may be adjusted to assure proper location of the muffins with respect to the tines.

As the muffins move downstream between the belt 56 and guide 194 the tines of the pairs of cars located on opposite sides of the belt are progressively extended until they engage fully and are withdrawn from the muffins. Because the downstream speeds of the belt 56 and of chains 108 and 108' are synchronized the tines move downstream at exactly the same speed as the muffins and undesirable tearing is avoided. After the tines have been fully withdrawn from the muffins they are moved further downstream between guide 194 and the belt discharges the muffins to the adjacent packaging machine. Each muffin tine assembly 46 or 48, in cooperation with the guide plates 193 located to either side of support plate 60 and guide 194, confines the muffins on the conveyor belt 56 while the muffins are tined by the other muffin tining assembly 48 or 46. The muffins are held in place on the conveyor belt with respect to the individual tining operations from each side of the belt. As disclosed herein, these operations are performed simultaneously to provide a saw-toothed weakening of the muffin.

The sinusoidal shape of the cam surfaces of assemblies 46 and 48, together with the inherent resiliency of the cams greatly reduces the noise of operation of splitter 10 while smoothly accelerating and decelerating the moving parts of the tine cars. All of this results in an improved machine which more easily conforms to industry and governmental noise and reliability standards than prior muffin splitters.

Sometimes the operator may desire to package muffins which have not been tined. Conventionally, when this occurs it has been necessary to remove the muffin splitter from the bakery line with the attendant stopping of the line and repositioning of the conveying elements in the line. After the run of untined muffins is completed the splitter must be reinserted into the line. Removal and insertion of a splitter into a line is timely, expensive and undesirable.

Muffin splitter 10 is easily adjusted to convey muffins from the infeed end 42 to the discharge end 44 without tining so that there need be no changes in the muffin line when changing over to untined muffins is undesired. In this event, crank or operator 188 is rotated to retract cams 160 and 160' out of the path of movement of cam followers 143. With the cams retracted, followers 143 move from the upstream end of the fixed cam rail 152 directly down the upper run of chains 108 to the downstream end of the rail 152. They do not engage cams 160 and 160' and the tines of the individual tine cars remain retracted and do not engage the muffins which move down the conveyor assembly 38. While it is possible that the slide bars 136 may move slightly away from the retracted position between the ends of the cam rails, movement of the cars toward the downstream end of the cam rail brings the cam followers 143 of any such car into engagement with the downstream surface of cam 154 so that the tines are moved back to the retracted position as the cam follower 143 is guided back to the retracted position behind the rail 152. See FIG. 7.

If desired, a clutch may be provided in the drive assembly 50 so that the sprocket gear driving chain 106 is disengaged when the cams 160 and 160' are moved to the retracted position. Disengagement of the clutch would deactivate the muffin tine assemblies 46 and 48 thereby reducing wear and power consumption when the muffin splitter 10 is used to convey unsplit muffins to the bagger.

The splitter 10 may be activated to split muffins by simply cranking the cams 160 and 160' in from the retracted position to the extended positions of FIG. 1 and by engaging the clutch to drive chain 106, if such a clutch is provided. If desired, the splitter 10 may be activated or deactivated while continuously carrying muffins from end 42 to end 44.

While I have illustrated and described perferred embodiments of my invention, it is understood that these are capable of modification, and I therefore do not wish to be limited to the precise details set forth, but desire to avail myself of such change and alterations as fall within the purview of the following claims.

What I claim my invention is:

1. A muffin splitter comprising a frame; a muffing conveying assembly on the frame including a conveyor for moving muffins from an infeed end to a discharge end; a pair of muffin tine assemblies on the frame located to either side of the muffin conveyor assembly, each muffin tine assembly including a plurality of elongate muffin-piercing tines, first means supporting the tines, second means for moving the first means and tines downstream along the muffin conveyor assembly at the same speed and in the same direction as the conveyor moves muffins along the conveyor, a first cam mounted on the frame between the conveyor and the normal path of movement of the first means along the muffin conveying assembly, a second cam movable on the frame between a retracted position located outwardly of the normal path of movement of the first means along the muffin conveying assembly and an extended position adjacent said first cam and in the path of normal movement of said first means along the muffin conveying assembly, said cams having smooth cam surfaces such that when the second cam is extended the second means moves the first means into engagement with said second cam to extend the tines into muffins on the conveyor path and to retract the tines from the muffins; and a cam moving device on the frame extending transversely past the cams and the muffin conveying assembly, drive connections between said device and each of said second cams of said pair of muffin tine assemblies operable, upon actuation of the cam moving device, to simultaneously shift said second cams between the retracted and extended positions, whereby, depending upon the location of said second cams by the cam moving device, tined or untined muffins may be moved along the conveyor from the infeed end to the discharge end.

2. A muffin splitter as in claim 1 wherein said cam moving device comprises at least one reverse threaded shaft extending between the sides of the frame, a threaded nut on each of said second cams engaging the threads on said shaft whereby rotation of the shaft moves the cams in opposite directions with respect to each other, and a crank for rotating the shaft and thereby moving the cams.

3. A muffin splitter as in claim 1 including a pair of transversely extending double threaded shafts journaled in bearings on the sides of the frame, each of said second cams carrying a pair of threaded nuts mounted on the threads of said shafts, a drive connection between said shafts so that the shafts rotate together and a drive connection between one of said shafts and a drive operator whereby upon actuation of said drive operator both of said shafts are rotated to move the cams between said retracted and extended positions.

4. A muffin splitter as in claim 1 where each of said muffin tine assemblies includes a pair of transversely extending shafts spaced along and located to one side of the muffin conveying assembly, a pair of sprocket gears located on said shafts, a conveying chain wrapped around said sprocket gears and having a run extending along the conveyor, said first means comprising a plurality of cars on said chain and extending transversely to each side of the chain, said tines being movably mounted on said cars away from the chain, and a stabilizing disc on each shaft located a distance away from said sprocket for stabilizing said cars as they are moved around the shaft.

5. A muffin splitter as in claim 4 including a pair of like stabilizing discs on each of said shafts, said discs being located on either side of the sprocket gear on each shaft.

6. A muffin splitter as in claim 4 wherein each car includes a body, a pair of parallel rods extending perpendicularly to the conveyor, a slide on said rods, a plurality of tines extending from said slide toward the conveyor, a cam follower engageable with said cams when the second cam is in the extended position, and a tine bar located on the body between the slide and the conveyor, said tine bar including a plurality of bores with each tine extending into each bore when the slide is away from the conveyor and extending outwardly of the bore to the conveyor when slide is moved toward the conveyor.

7. A muffin splitter as in claim 6 wherein the walls of said bores are made of a plastic material.

8. A muffin splitter as in claim 6 wherein said tine bar is made of an ultra high molecular weight polyethylene plastic material.

9. A muffin splitter as in claim 8 wherein the ends of said rods extend into oversized bores in the tine bar.

10. A muffin splitter as in claim 4 including a drive assembly, a drive connection joins such assembly to one shaft of each muffin tine assembly and wherein one drive connection includes means for adjusting the relative position of the cars of the muffin tine assemblies so that the tines of such cars may extend past each other during tining.

11. A muffin splitter as in claim 4 wherein each muffin tine assembly includes a pair of car guide rails extending along a straight run of said chain between said sprockets, a low friction bearing surface on one of said guide rails, a metal suppot surface on the other of said guide rails, a metal surface of said cars engageable with said low friction bearing surfaces and wherein each tine bar is formed from a low friction material, said tine bar engaging the metal surface of the other guide rail.

12. A muffin splitter as in claim 4 wherein both cams of each muffin tine assembly have sinusoidal cam surfaces and wherein said surfaces are formed from a resilient plastic-base composition material.

13. A muffin splitter as in claim 1 wherein each of the muffin tine assemblies includes a pair of transversely extending shafts spaced along and located to one side of the muffin conveying assembly, a pair of sprocket gears located on said shafts, and a conveying chain wrapped around said sprocket gears and having a run extending along the conveyor, said first means comprising a plurality of cars on the chain.

14. A muffin splitter as in claim 13 wherein each car includes a body, a pair of parallel rods extending perpendicularly to the conveyor, a slide on said rods, a plurality of tines extending from said slide toward the conveyor, a cam follower engageable with said cams when the second cam is in the extended position, and a tine bar located on the body between the slide and the conveyor, said tine bar including a plurality of bores with each tine extending into each bore when the slide is away from the conveyor and extending outwardly of the bore to the conveyor when slide is moved toward the conveyor.

15. A muffin splitter as in claim 14 wherein said tine bar is made of an ultra high molecular weight polyethylene plastic material.

16. A muffin splitter as in claim 15 wherein the ends of said rods extend into oversized bores in the tine bar.

17. A muffin splitter as in claim 13 including a drive assembly, a drive connection joins such assembly to one shaft of each muffin tine assembly and wherein one drive connection includes means for adjusting the relative position of the cars of the muffin tine assemblies so that the tines of such cars may extend past each other during tining.

18. A muffin splitter as in claim 13 wherein each muffin tine assembly includes a pair of car guide rails extending a straight run of saic chain between said sprockets, a low friction bearing surface on one of said guide rails, a metal support surface on the other of said guide rails, a metal surface of said cars engageable with said low friction bearing surfaces and wherein each tine bar is formed from a low friction material, said tine bar engaging the metal surface of the other guide rail.

19. A muffin splitter comprising a frame; a muffin conveying assembly on the frame including a conveyor for moving muffins from an infeed end to a discharge end; a pair of muffin tine assemblies on the frame located to either side of the muffin conveying assembly, each muffin tine assembly including a plurality of elongate muffin-piercing tines, first means supporting the tines, second means for moving the first means and tines downstream along the muffin conveying assembly at the same speed as the conveyor moves muffins along the assembly, a first cam located between the conveyor and the normal path of movement of the first means along the muffin conveying assembly when the splitter is in an operative position, a second cam movable on the frame between an inoperative position located away from the normal path of movement of the first means along the muffin conveying assembly and an operative position in the path of normal movement of said first means along the muffin conveying assembly, said cams having smooth cam surfaces such that when the second cam is in the operative position the second means moves the first means into engagement with the second cam to extend the tines into muffins on the conveyor path and, with further downstream movement, into engagement with the first cam to retract the tines from the muffins; and a cam moving device on the frame including a control and a pair of drive connections, each connection engaging one of the second cams of said pair of muffin tine assemblies operable by the control to shift said second cams simultaneously between the operative and inoperative positions, whereby, depending upon the location of the second cam tined or untined muffins may be moved along the conveyor from the infeed end to the discharge end.

20. A muffin splitter comprising a frame; a muffin conveying assembly on the frame including a conveyor for moving muffins from an infeed end to a discharge end; a muffin tine assembly on the frame located to one side of the muffin conveying assembly, the muffin tine assembly including a plurality of elongate muffin-piercing tines, first means supporting the tines, second means for moving the first means and tines downstream along the muffin conveyor assembly at the same speed as the conveyor moves muffins along the conveying assembly, a first cam mounted on the frame between the conveyor and the normal path of movement of the first means along the muffin conveying assembly, a second cam movable on the frame between a retracted position located outwardly of the normal path of movement of the first means along the muffin conveying assembly and an extended position adjacent said first cam and in the path of normal movement of said first means along the muffin conveying assembly, said cams having smooth cam surfaces such that when the second cam is extended the second means moves the first means into engagement with said second cam to extend the tines into muffins on the conveyor and, with further downstream movement, into engagement with the first cam to retract the tines from the muffins; means on the frame adjacent the muffin conveyor assembly for holding the muffins in place on the conveyor while the tines are extended into and retracted from the muffins; and a cam moving device on the frame, a drive connection between said device and said second cam operable, upon actuation of the cam moving device, to shift said second cam between the retracted and extended positions, whereby, depending upon the location of said second cam by the cam moving device, tined or untined muffins may be moved along the conveyor from the infeed end to the discharge end.

21. A muffin splitter as in claim 20 wherein said muffin tine assembly includes a pair of transversely extending shafts spaced along and located to one side of the muffin conveying assembly, a pair of sprocket gears located on said shafts, a conveying chain wrapped around said sprocket gears and having a run extending along the conveyor, said first means comprising a plurality of cars on said chain and extending transversely to each said of the chain, said tines being movably mounted on said cars away from the chain, and a stabilizing disc on each shaft located a distance away from the said sprocket for stabilizing said cars as they are moved around the shaft.

22. A muffin splitter as in claim 21 including a pair of like stabilizing discs on each of said shafts, said discs being located on either side of the sprocket gear on each shaft.

23. A muffins splitter as in claim 21 wherein each car includes a body, a pair of parallel rods extending perpendicularly to the conveyor, a slide on said rods, a plurality of tines extending from said slide toward the conveyor, a cam follower engageable with said cams when the second cam is in the extended position, and a tine bar located on the body between the slide and the conveyor, said tine bar including a plurality of bores with each tine extending into each bore when the slide is away from the conveyor and extending outwardly of the bore to the conveyor when slide is moved toward the conveyor.

24. A muffin splitter as in claim 23 wherein the walls of said bores are made of a plastic material.

25. A muffin splitter as in claim 23 wherein said tine bar is made of an ultra high molecular weight polyethylene plastic material.

26. A muffin splitter as in claim 25 wherein the ends of said rods extend into oversized bores in the tine bar.

27. A muffin splitter as in claim 21 wherein said muffin tine assembly includes a pair of car guide rails extending along a straight run of said chain between said sprockets, a low friction bearing surface on one of said guide rails, a metal support surface on the other of said guide rails, a metal support surface on the other of said guide rails, a metal surface of said cars engageable with said low friction bearing surfaces and wherein each tine bar is formed from a low friction material, said tine bar engaging the metal surface of the other guide rail.

28. A muffin splitter as in claim 21 wherein both cams of said muffin tine assembly having sinusoidal cam surfaces and wherein said surfaces are formed from a resilient plastic-base composition material.

29. A muffin splitter as in claim 20 wherein said muffin tine assembly includes a pair of transversely extending shafts spaced along and located to one side of the muffin conveying assembly, a pair of sprocket gears located on said shafts, and a conveying chain wrapped around said sprocket gears and having a run extending along the conveyor, said first means comprising a plurality of cars on the chain.

30. A muffin splitter as in claim 29 wherein each car includes a body, a pair of parallel rods extending perpendicularly to the conveyor, a slide on said rods, a plurality of tines extending from said slide toward the conveyor, a cam follower engageable with said cams when the second cam is in the extended position, and a tine bar located on the body between the slide and the conveyor, said tine bar including a plurality of bores with each tine extending into each bore when the slide is away from the conveyor and extending outwardly of the bore to the conveyor when slide is moved toward the conveyor.

31. A muffin splitter as in claim 30 wherein said tine bar is made of an ultra high molecular weight polypropylene plastic material.

32. A muffin splitter as in claim 31 wherein the ends of said rods extend into oversized bores in the tine bar.

33. A muffin splitter as in claim 29 wherein said muffin tine assembly includes a pair of car guide rails extending a straight run of said chain between said sprockets, a low friction bearing surface on one of said guide rails, a metal support surface on the other of said guide rails, a metal surface of said cars engageable with said low friction bearing surfaces and wherein each tine bar is formed from a low friction material, said tine bar engaging the metal surface of the other guide rail.

34. A muffin splitter as in claim 20 wherein said means comprises a second muffin tine assembly similar to said mentioned muffin tine assembly located to the other side of the muffin conveying assembly, the tines of said assemblies being offset from each other along the conveying assembly whereby muffins are tined from both sides of the conveyor.

* * * * *

UNITED STATES PATENT OFFICE
CERTIFICATE OF CORRECTION

PATENT NO. : 4,159,662
DATED : July 3, 1979
INVENTOR(S) : John A. Weaver

It is certified that error appears in the above–identified patent and that said Letters Patent are hereby corrected as shown below:

Column 3, line 59, change "endges" to --edges--.

Column 9, line 60, change "suppot" to --support--.

Column 12, lines 17 and 18, delete "a metal support surface on the other of said guide rails,".

Signed and Sealed this

Ninth Day of October 1979

[SEAL]

Attest:

RUTH C. MASON
Attesting Officer

LUTRELLE F. PARKER
Acting Commissioner of Patents and Trademarks